United States Patent
Mashouf

(10) Patent No.: US 11,382,722 B2
(45) Date of Patent: Jul. 12, 2022

(54) ORTHODONTIC BRACKETS FOR DECIDUOUS TEETH

(71) Applicant: Cameron Mashouf, San Jose, CA (US)

(72) Inventor: Cameron Mashouf, San Jose, CA (US)

( * ) Notice: Subject to any disclaimer, the term of this patent is extended or adjusted under 35 U.S.C. 154(b) by 269 days.

(21) Appl. No.: 15/863,830

(22) Filed: Jan. 5, 2018

(65) Prior Publication Data

US 2018/0125612 A1    May 10, 2018

Related U.S. Application Data

(63) Continuation-in-part of application No. 13/050,385, filed on Mar. 17, 2011, now Pat. No. 10,433,933.

(51) Int. Cl.
*A61C 7/16* (2006.01)
*A61C 7/20* (2006.01)
(Continued)

(52) U.S. Cl.
CPC ............... *A61C 7/16* (2013.01); *A61C 7/023* (2013.01); *A61C 7/12* (2013.01); *A61C 7/20* (2013.01); *A61C 7/04* (2013.01); *A61C 2202/00* (2013.01)

(58) Field of Classification Search
CPC .. A61C 7/16; A61C 7/023; A61C 7/12; A61C 7/20; A61C 7/04; A61C 2202/00
See application file for complete search history.

(56) References Cited

U.S. PATENT DOCUMENTS 4,243,386 A * 1/1981 Kawaguchi ............... A61C 7/16
  433/9
4,544,353 A * 10/1985 Maurer ..................... A61C 7/16
  433/9

(Continued)

FOREIGN PATENT DOCUMENTS

WO    2011087985 A1    7/2011

OTHER PUBLICATIONS

Endo et al., Comparison of Shear Bond Strengths of Orthodontic Brackets Bonded to Deciduous and Permanent Teeth, American Journal of Orthodontics and Dentofacial Orthopedics, vol. 134, No. 2, Aug. 2008, pp. 198-208.

(Continued)

*Primary Examiner* — Nicholas D Lucchesi
*Assistant Examiner* — Hao D Mai
(74) *Attorney, Agent, or Firm* — Kilpatrick Townsend & Stockton LLP

(57) ABSTRACT

The present invention relates to orthodontic brackets designed for use with the deciduous teeth and method for its use. The brackets provide one or more debonding tabs which reduces the potential for damage to the deciduous tooth due to the application of excessive force during the debonding process. The small size of the brackets allow the brackets to fit available crown space on the deciduous teeth. Further the brackets are shaped to minimize mechanical forces applied to the deciduous teeth when engaged with an archwire. The bracket bases are shaped to conform to the morphology of the deciduous tooth crown surface thereby providing an optimal adhesive interface with the deciduous tooth. The deciduous brackets provide proper adhesion to avoid unwanted detachment of the brackets which often occurs when the use of permanent brackets is attempted on the deciduous teeth.

5 Claims, 15 Drawing Sheets

(51) Int. Cl.
*A61C 7/02* (2006.01)
*A61C 7/12* (2006.01)
*A61C 7/04* (2006.01)

(56) References Cited

U.S. PATENT DOCUMENTS

| | | | |
|---|---|---|---|
| 4,830,612 A | 5/1989 | Bergersen | |
| 4,871,310 A | 10/1989 | Vardimon | |
| 4,904,183 A | 2/1990 | Hannan et al. | |
| 4,936,773 A * | 6/1990 | Kawaguchi | A61C 7/12 433/8 |
| 4,950,157 A | 8/1990 | Cleary | |
| 5,035,612 A | 7/1991 | Martin et al. | |
| 5,062,793 A | 11/1991 | Cleary et al. | |
| 5,098,288 A | 3/1992 | Kesling | |
| 5,158,452 A * | 10/1992 | Franseen | A61C 7/12 433/24 |
| 5,226,814 A * | 7/1993 | Allen | A61C 7/12 433/15 |
| 5,263,859 A | 11/1993 | Kesling | |
| 5,362,232 A * | 11/1994 | Franseen | A61C 7/12 433/9 |
| 5,366,372 A * | 11/1994 | Hansen | A61C 7/02 433/4 |
| 5,395,237 A * | 3/1995 | Pospisil | A61C 7/14 29/896.11 |
| 5,439,379 A * | 8/1995 | Hansen | A61C 7/16 433/8 |
| 5,441,408 A * | 8/1995 | Moschik | A61C 7/12 433/8 |
| 5,645,421 A | 7/1997 | Slootsky | |
| 5,711,665 A * | 1/1998 | Adam | A61C 19/004 433/9 |
| 5,746,594 A * | 5/1998 | Jordan | A61C 7/12 433/9 |
| 6,280,184 B1 | 8/2001 | Hamilton | |
| 6,382,965 B1 | 5/2002 | Ruiz-Vela et al. | |
| 6,474,988 B1 | 11/2002 | Georgakis et al. | |
| 7,252,505 B2 | 8/2007 | Lai | |
| 7,452,205 B2 | 11/2008 | Cinader, Jr. et al. | |
| 7,549,860 B2 | 6/2009 | Soo et al. | |
| 7,581,949 B2 | 9/2009 | Farzin-Nia | |
| 7,670,140 B2 | 3/2010 | Hart et al. | |
| 7,819,660 B2 | 10/2010 | Cosse | |
| 2004/0219470 A1 | 11/2004 | Farzin-Nia | |
| 2005/0136370 A1 | 6/2005 | Brennan et al. | |
| 2006/0019211 A1 | 1/2006 | Ricketts et al. | |
| 2006/0127835 A1 | 6/2006 | Soo et al. | |
| 2006/0275729 A1 | 12/2006 | Fornoff | |
| 2007/0207435 A1* | 9/2007 | Devanathan | A61C 7/02 433/9 |
| 2008/0020338 A1* | 1/2008 | Zakhem | A61C 7/143 433/9 |
| 2008/0138757 A1 | 6/2008 | Lai et al. | |
| 2008/0153051 A1 | 6/2008 | Hart et al. | |
| 2009/0305183 A1 | 12/2009 | Chen | |
| 2011/0081622 A1 | 4/2011 | Mashouf | |
| 2015/0359611 A1* | 12/2015 | Rudman | A61C 7/002 433/9 |
| 2018/0168777 A1* | 6/2018 | Damon | A61C 7/14 |

OTHER PUBLICATIONS

Non-Final Office Action dated Aug. 3, 2021 in U.S. Appl. No. 16/595,378, filed Oct. 7, 2019. 16 pages.

Notice of Allowance dated Feb. 17, 2022 in U.S. Appl. No. 16/595,378, filed Oct. 7, 2019. 8 pages.

\* cited by examiner

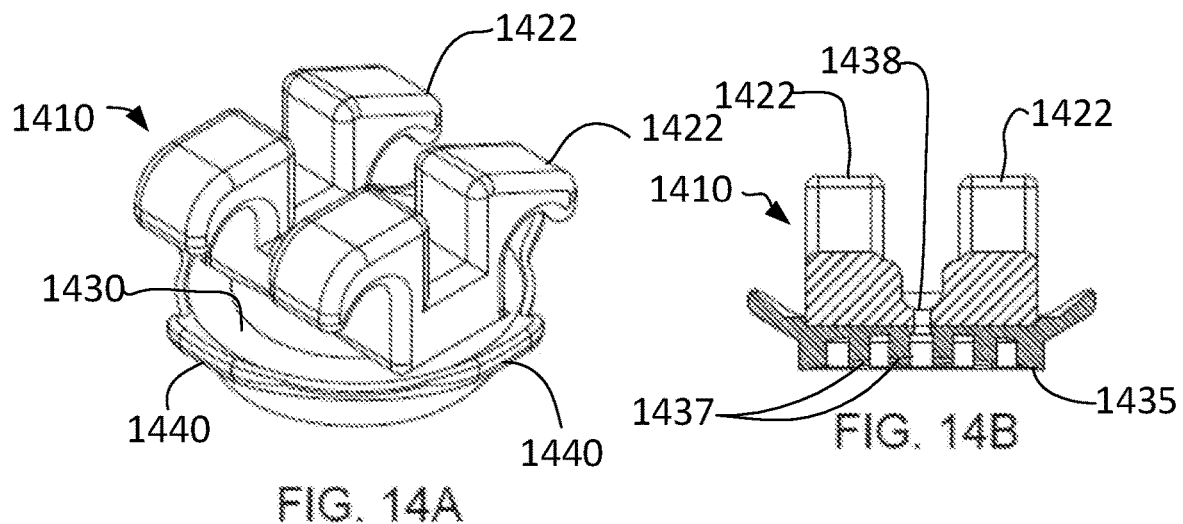
FIG. 14A
FIG. 14B
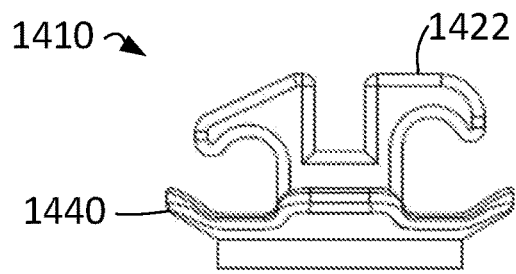
FIG. 14C
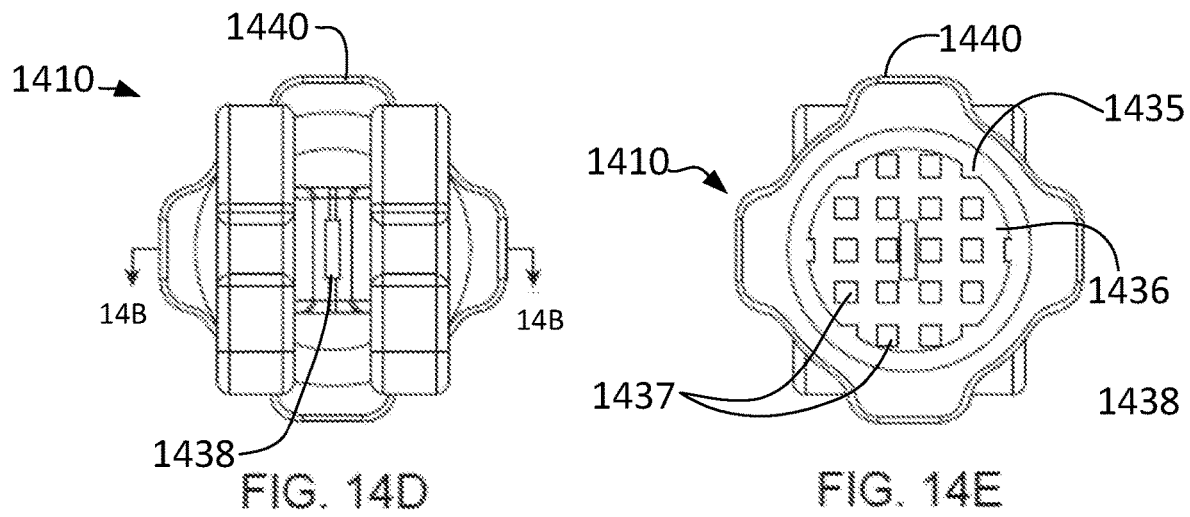
FIG. 14D
FIG. 14E

ORTHODONTIC BRACKETS FOR DECIDUOUS TEETH

CROSS-REFERENCES TO RELATED APPLICATIONS

This application is a continuation-in-part of U.S. application Ser. No. 13/050,385, filed Mar. 17, 2011, which is incorporated by reference in its entirety as if fully set forth herein.

TECHNICAL FIELD

This invention relates to the use of orthodontic brackets on deciduous teeth to correct tooth alignment.

BACKGROUND OF THE INVENTION

One type of common orthodontic treatment involves the use of a set of tiny appliances commonly known as brackets and buccal tubes. Buccal tubes are normally mounted on the molars and brackets are attached to all other teeth. Each bracket is secured to a corresponding tooth through a bonding adhesive which is sandwiched between the pad of the bracket on one side and the enamel surface of the tooth on the other side. Each bracket has a slot to receive a resilient archwire. The slot forms a track to guide movement of the teeth to desired positions. Ends of archwire are commonly placed in slots or channels of buccal tube appliances that are attached to the molar teeth either through bonding with adhesive or first welded on a band and then cemented on the tooth.

Use of Brackets on Deciduous Teeth

Up to the present time, the orthodontic brackets and tubes (braces) which are available in the market have been designed for permanent teeth. Several forms of bite problems (malocclusion) develop during childhood in the deciduous (primary) dentition. Most common amongst them are cross bites of the anterior or posterior teeth. The advances in our understanding of children growth and development and in interceptive orthodontics have made the treatment of younger children more desirable.

Such treatment is done during the deciduous (primary) dentition or during mixed-dentition period when the deciduous teeth are still present. There are circumstances that early correction of a malocclusion during deciduous or mixed-dentition periods would either prevent or reduce the extent of treatment at a later date.

Deciduous teeth can be moved to allow better jaw relationship, to make room for the permanent teeth or used as anchors for more efficient movement of the permanent teeth. Malocclusions that involve deciduous teeth are simpler and easier to correct than malocclusions of permanent teeth. This is due to the younger age of the patients for whom the tissues surrounding deciduous teeth are more adaptive and allow faster movement of the deciduous teeth with smaller increments of force.

Due to a lack of availability of brackets and tubes for the deciduous teeth, orthodontists are forced to either defer the treatment to allow the development of permanent dentition or use the appliances that are designed for permanent teeth and place them on the deciduous teeth. Due to different size and shape of these teeth the permanent teeth bracket bases do not adapt well to the deciduous teeth surfaces. Further, studies performed in Japan (American Journal of Orthodontics and Dentofacial Orthopedics Vol. 134/2008 pp. 198-208 article-"Comparison of shear bond strengths of orthodontic brackets bonded to deciduous and permanent teeth" by Endo, T. et. al.) have shown that permanent brackets bond more weakly to deciduous teeth as opposed to permanent teeth. The researchers attributed the weak bonding to a difference in the chemical structure of the enamel found on deciduous teeth as compared to permanent teeth. As a result of these and other factors, brackets bonded to deciduous teeth frequently come loose during the course of treatment creating inconvenience and frustration for both the patient and the dentist.

Additionally, the mode and rate of movement of deciduous teeth is different from permanent teeth. The brackets that are designed for permanent teeth are too large for the deciduous teeth. They therefore interfere with proper brushing, cause impingement of the gum tissues and apply several unnecessary force vectors on the deciduous teeth.

Debonding

Debonding brackets from deciduous teeth may also be a problem. Deciduous teeth become progressively looser prior to falling out due to the resorption of their roots. Therefore they may not have the structural integrity to easily sustain the pressure required for removal of a bracket as would a permanent tooth and cause pain for patient during removal.

Metal brackets are commonly debonded using a plier-type hand instrument. Force is typically applied in the mesial-distal or occluso-gingival direction causing deformation in the ductile bracket body. This deformation effects a separation or fracture at the interface between the bonding adhesive and the bracket base allowing the bracket to be peeled or pried away from the tooth surface.

Brackets made of materials more brittle than metal, such as ceramic, are not easily peeled or pried away from the tooth surface and tend to fracture under an applied force. An attempt to apply mesial-distal force as described with metal brackets generally results in the fracture of the tie wings or other portions of the bracket. Various tools have been put forward to remedy this problem (e.g. U.S. Pat. No. 4,950,157 to Cleary, U.S. Pat. No. 4,904,183 to Hannan and U.S. Pat. No. 6,382,965 to Ruiz-Vela), but none has provided a complete solution.

U.S. Pat. No. 5,439,379 to Hansen discloses an orthodontic bracket design, the purpose of which is to facilitate the debonding of ceramic orthodontic brackets. The disclosed design provides for a bracket with mesial and distal sections separated by an elongated channel extending generally in the occlusal-gingival direction. During debonding the pressure applied with a tool such as pliers causes the mesial and distal sections to pivot towards each other, thereby applying pressure to the bonding surfaces. In theory this design puts significantly less stress on the bracket in order to effectuate debonding than would be the case with a conventional ceramic orthodontic bracket.

BRIEF SUMMARY OF THE INVENTION

The present invention relates to orthodontic deciduous brackets, kits and method for use thereof. The orthodontic deciduous brackets are designed for use with deciduous teeth. Deciduous teeth have been shown by various practitioners to be particularly useful anchors for the alignment of permanent teeth when integrated into a dental appliance. Embodiments of the orthodontic brackets for deciduous teeth are unique in providing debonding tabs which reduces the potential for damage to the deciduous tooth or for pain as a result of application of excessive force during the debonding process. The small size of orthodontic brackets for deciduous teeth allows them to fit available crown space on the deciduous teeth. Further the orthodontic brackets for deciduous teeth is shaped to minimize mechanical forces applied to the deciduous teeth when engaged with an archwire. Bases of the orthodontic brackets for deciduous teeth are shaped to conform to the morphology of the deciduous crown surfaces of various deciduous teeth thereby providing an optimal adhesive interface with the deciduous teeth. The orthodontic brackets for deciduous teeth provide proper adhesion to avoid unwanted detachment of the bracket which often occurs when the use of permanent brackets is attempted on the deciduous teeth.

BRIEF DESCRIPTION OF THE DRAWINGS

FIGS. 14A-E show of an embodiment of a deciduous bracket having angled debonding tabs.

DETAILED DESCRIPTION OF THE INVENTION

Figure 1:
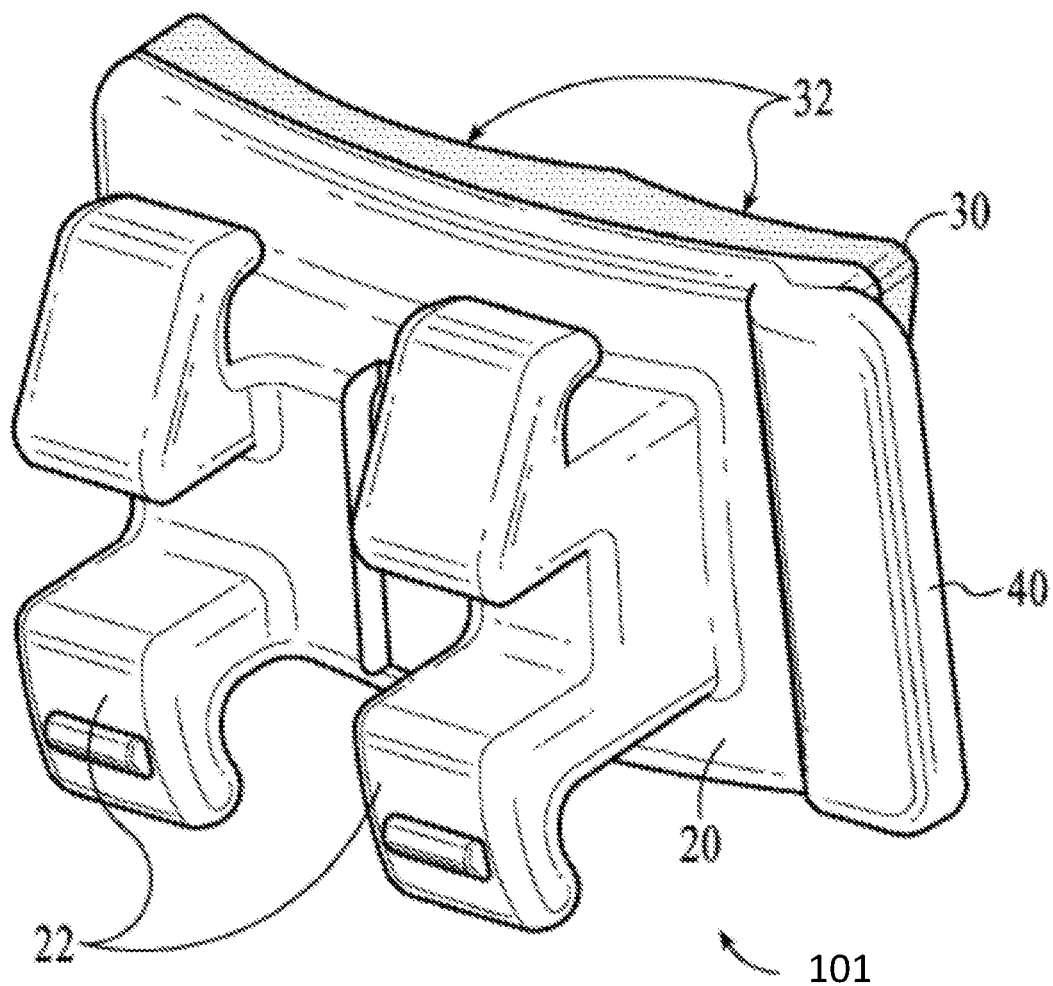
FIG. 1 is a perspective view of an embodiment of a deciduous bracket.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

For the purposes of this disclosure the term "deciduous bracket" refers to an orthodontic bracket designed for use on a deciduous human tooth.

Orthodontic treatment is defined as correction of misaligned teeth and improper bite. Alignment of crooked teeth and correction of bite problems are accomplished by devices that are referred to as orthodontic appliances. The most common type of orthodontic appliances are called fixed appliances or braces. Fixed appliances include tiny pieces called brackets which are secured to the teeth and serve as handles to move the teeth. Brackets have a slot to receive an archwire. Bracket slots form a track to guide movement of the teeth to desired positions. Ends of the archwire are commonly placed in channels called buccal tubes which are mounted on the patient's molar teeth. Brackets and buccal tubes are collectively called attachments.

A large proportion of orthodontic treatment is done around adolescence which corresponds with completion of the so called permanent dentition. For this reason, the orthodontic attachments are designed to optimally fit the permanent teeth. However, misalignment of teeth and improper bite (malocclusion) usually become noticeable in early mixed-dentition at the age of about seven. In this stage of a child's development, the permanent first molars erupt in the posterior region of the mouth and the permanent incisors erupt in the anterior region. Deciduous canines, first and second molars which are interposed between the permanent first molars and incisors continue their presence and function for at least four more years in the buccal segments, hence the term mixed dentition.

For many forms of malocclusion, the mixed-dentition period provides an optimal treatment time. The treatment that commences during mixed-dentition is called interceptive orthodontic treatment. There are rare circumstances that treatment is indicated prior to mixed dentition period, in children younger than seven years of age, during the so called deciduous dentition. Treatment that is initiated in mixed-dentition has to consider the presence of the deciduous teeth which occupy a significant portion of the dental arches. At the present time a practitioner who engages in interceptive orthodontic treatment, has two choices:

1. Placement of the attachments on the permanent teeth and bypassing the deciduous teeth in the dental arch. The appliance design used in this technique is commonly called the 2 by 4 appliance. Generally speaking, the 2 by 4 approach is inefficient due to the long, unsupported spans of archwires that connect the permanent molars to permanent incisors.

2. Inclusion of the deciduous teeth in the appliances by using the brackets of permanent teeth and placing them on the deciduous teeth as well as the permanent teeth. In this approach the brackets for permanent teeth do not adapt well to the deciduous teeth and detach frequently causing delays and discomfort for the practitioner and patient.

The present invention involves brackets designed specifically for attachment to deciduous teeth. A feature of embodiments of the deciduous brackets is the bracket bases which are shaped to be complementary to the surface morphologies of specific deciduous teeth. For example, embodiments include surface morphologies complementary to top and/or bottom first molars, top and/or bottom second molars, and top and/or bottom canines. In embodiments, deciduous brackets for left and right teeth may have mirror image surface morphologies or may have left-right symmetrical surface morphologies to be used on either left or right teeth.

Advantages of Using Deciduous Teeth in Interceptive Treatment

Deciduous teeth can be used as anchors to move the permanent teeth more efficiently. The deciduous teeth may also be beneficially moved to allow more space for the permanent teeth. Using brackets on the deciduous teeth and their inclusion in the mechanics of tooth movement increases the efficiency of the appliances in the following circumstances:

1. Correction of crowding: Development of additional space and the supportive structures for permanent teeth is accomplished through expansion of the posterior segments. In the maxillary arch a rapid palatal expansion appliance is used to expand the maxilla using the permanent and deciduous teeth in the posterior segments as anchors. Once there is adequate space, the deciduous teeth and permanent incisors are bracketed. A series of archwires are used for leveling and alignment of the incisors using deciduous canines as anchors for alignment of the incisors. Due to proximity of the deciduous canines to the permanent incisors, the deciduous canines serve as ideal anchor teeth for efficient alignment of the permanent incisors. In the mandibular arch a removable lingual arch may be employed initially to expand the permanent first molars. The deciduous canines and molars are bonded along with the permanent incisors once adequate expansion of the permanent molars is achieved. The deciduous molars and canines are expanded and incisors are leveled and aligned with a series of archwires using permanent molars as anchors.

2. Correction of deep bite and open bite cases: Intrusion and extrusion of the permanent incisors are facilitated by using the deciduous teeth as anchors. Opening or closing of the bite is facilitated by progressively positioning the deciduous brackets more gingivally or occlusally and by tilting them so that their mesial aspects point downward or upward from the second deciduous molar to deciduous canine.

3. Correction of cross bites: There are many different types of cross bite which require different approaches to their treatment plan. Deciduous brackets can offer more efficient means of correcting various types of cross bites. For correction of a complex cross bite involving both upper and lower dental arches, expansion of maxilla and mandibular arch are accomplished with a maxillary expansion appliance (MEA) and a lower lingual arch (LLA) respectively. Maxillary incisors are advanced using stops in the archwires. Mandibular incisors are retracted using the additional space provided by expansion of the permanent and deciduous molars and canines. In the correction of skeletal cross bites due to a maxillary under development, a face mask or reverse pull head gear can be employed. Intermaxillary elastics can also be used for additional effects. In the cases of simpler forms of cross bites such as those involving only a portion of the dental arch, the mechanics can be simplified to reflect the less complex nature of these cases.

4. Correction of impacted permanent first molars: Occasionally, the permanent first molars develop ectopically under the distal bulge of the deciduous second molars. The affected permanent molar can be corrected through sectional mechanics with bonded brackets on the adjacent deciduous molars and the impacted first molar. Embodiments of the present invention provides the practitioners with simple and inexpensive attachments for the deciduous teeth. The anatomically designed bases of these attachments allow adequate adaptation to the surface of the deciduous teeth and therefore bond reliably to the enamel of the deciduous teeth. Inclusion of the deciduous teeth in the mechanics of tooth movement increases the efficiency of the appliances and provides new and innovative approaches for the treatment of children during mixed-dentition FIG. 1 shows a perspective view of an embodiment of a deciduous bracket 10. In this embodiment bracket base 30 conforms to a deciduous tooth crown surface by means of two base indentations 32. The indentations 32 of the embodiment of deciduous bracket 10, shown in FIG. 1, are configured to be complementary in shape and size to the surface morphologies of deciduous first molars. In embodiments, deciduous brackets include one or more debonding tabs, which can be used to debond the deciduous brackets from deciduous teeth, as will be discussed below. Deciduous bracket 10 includes debonding tab 40. As shown in FIG. 1, in embodiments debonding tab 40 is a horizontal extension away from the buccal body surface 20 situated on the mesial side of deciduous bracket 10. Deciduous bracket 10 further includes tie wings 22 which allow for the engagement of an archwire.

Figure 2:
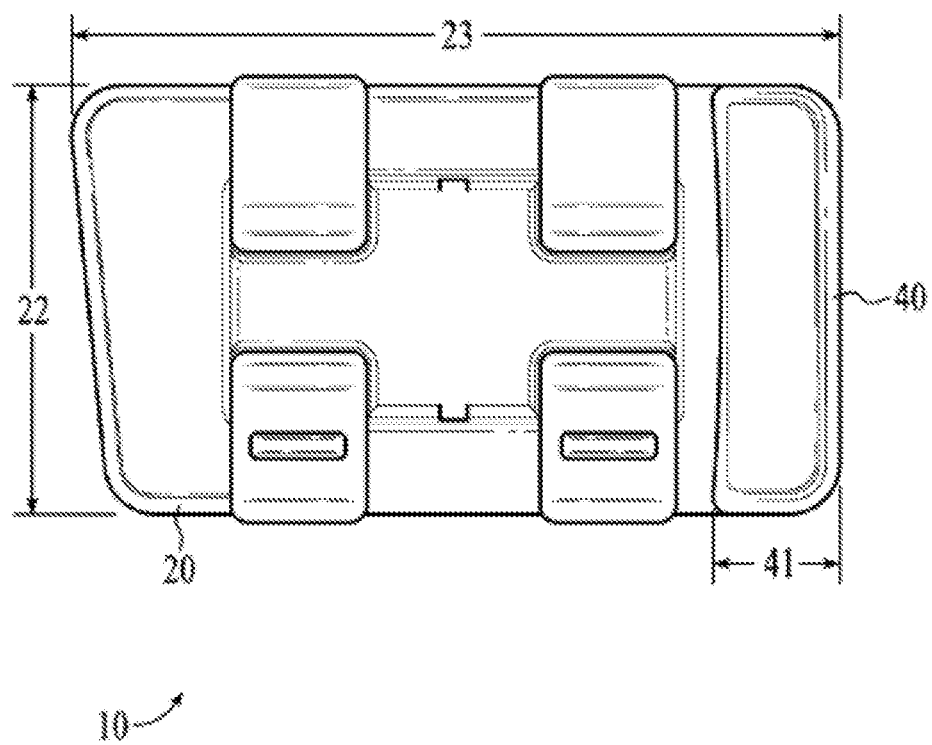
FIG. 2 is a buccal view of the embodiment of FIG. 1.

FIG. 2 is a buccal view of deciduous bracket 10 shown in FIG. 1. The occlusal-gingival dimension 22 and mesio-distal 23 dimension of deciduous bracket 10 are both sized to provide maximum surface area contact between deciduous bracket 10 and a deciduous tooth. In embodiments, deciduous bracket 10 may be between 2.5 mm and 4.5 mm in the occluso-gingival dimension and between 3.0 mm and 5.0 mm in the mesio-distal dimension. Maximizing the bracket surface area in contact with the deciduous tooth crown surface is beneficial in maintaining a solid bond between a deciduous bracket and the crown surface of a deciduous tooth. The debonding tab width 41 of debonding tab 40 defines the depth of the access area available for interaction with a debonding tool, as further explained below.

Figure 3:
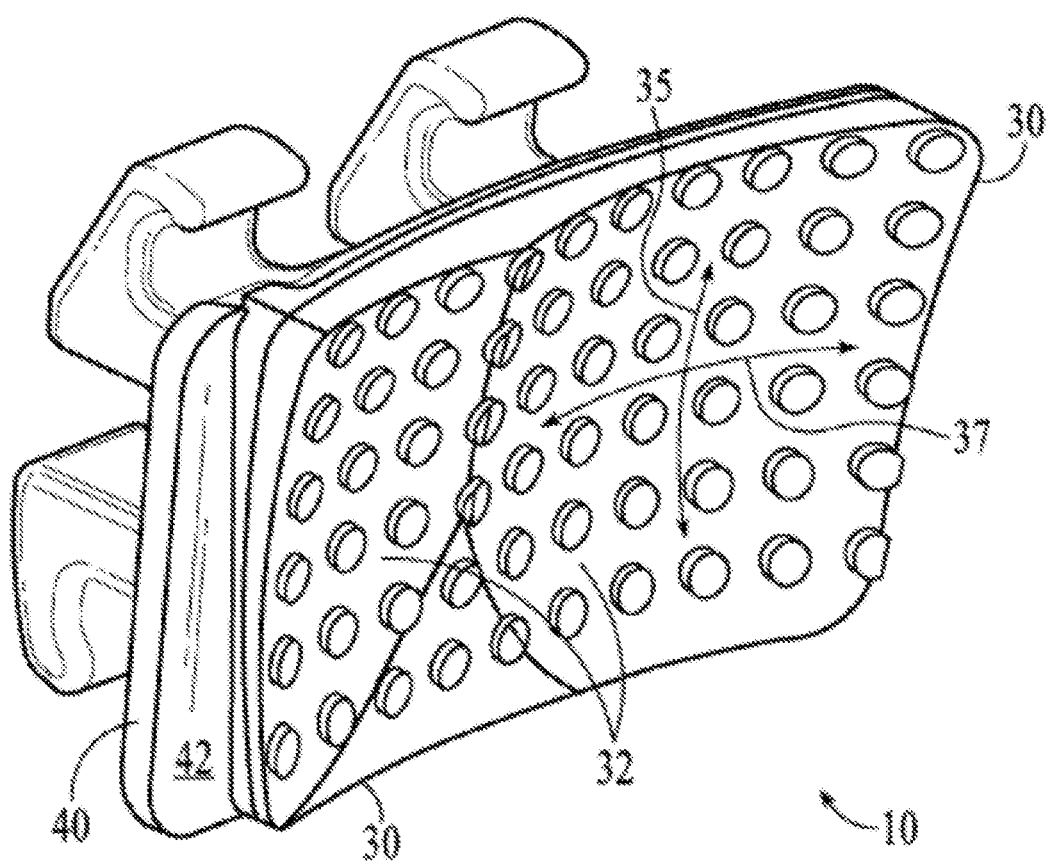
FIG. 3 is a second perspective view of the embodiment of FIG. 1 showing base indentations.
Figure 8:
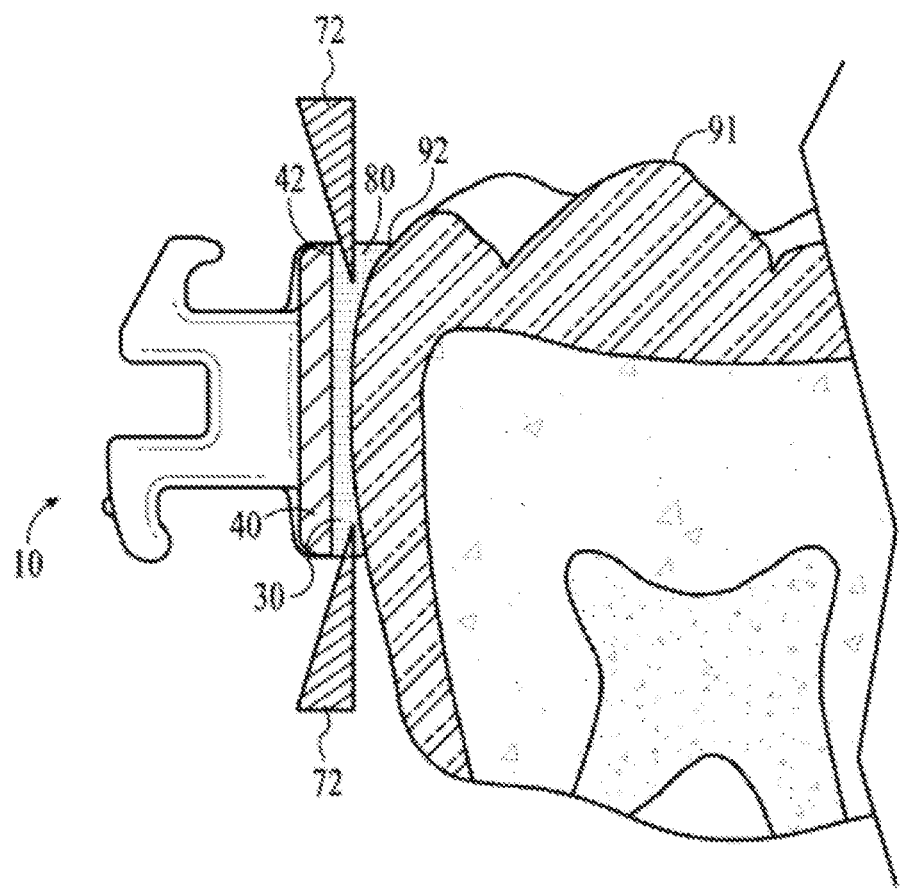
FIG. 8 depicts the process of debonding a deciduous bracket from a deciduous tooth with the debonding tool in an intermediate position.

The curvatures of the deciduous bracket base indentations may provide for optimal bonding between a bracket surface and the corresponding deciduous tooth crown surface. FIG. 3 is a second perspective view of the embodiment of deciduous bracket 10, shown in FIG. 1, showing the two indentations 32 of bracket base 30. Directional arrow 37 describes the mesio-distal radius of a base indentation 32. The mesio-distal radius of a base indentation 32 can range from about 3 to about 4.5 mm, which corresponds to the horizontal curvature of cusps in the surface morphologies of deciduous first molars. The radius in the occlusal-gingival plane is represented by directional arrow 35 and can range from about 4.5 to about 6.5 mm which corresponds to the vertical curvature of cusps in the surface morphologies of deciduous first molars. Also shown in FIG. 3 is debonding tab 40 and the debonding tab lingual surface 42. As shown, debonding tab lingual surface 42 is recessed buccally as compared to the bracket base 30, thereby defining a gap which defines a debonding access area 80, as shown in FIG. 8, when deciduous bracket 10-1 is bonded to a deciduous tooth.

Figure 4:
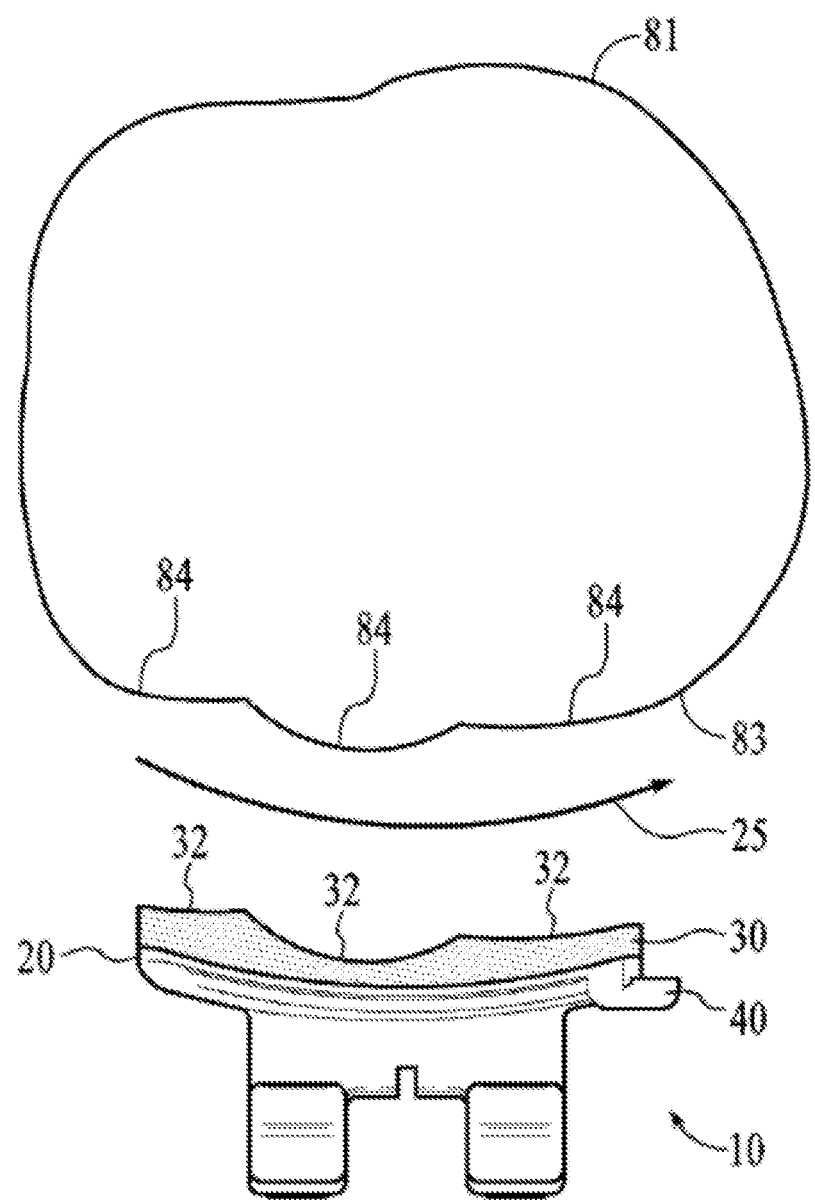
FIG. 4 is an occlusal view of an embodiment of a deciduous bracket designed for use on a deciduous lower second molar.

FIG. 4 shows an occlusal view of an embodiment of a deciduous bracket 10 configured to be complementary in shape to the surface morphologies of lower right deciduous second molar 81. As shown in FIG. 4, base indentations 32 of deciduous bracket 10 can correspond to distobuccal cusp 84 of the deciduous lower second molar 81 to facilitate tight bonding using a minimal amount of adhesive. Directional arrow 25 describes the overall radius of bracket base 30. The radius of deciduous bracket 10 can range from about 8 to 11 mm which corresponds to the overall curvature of the buccal crown surface 83 of deciduous second molar 81. In embodiments, for example as shown in FIG. 4, debonding tabs 40 may extend mesially from the buccal body surface 20 of deciduous bracket 10.

Figure 5:
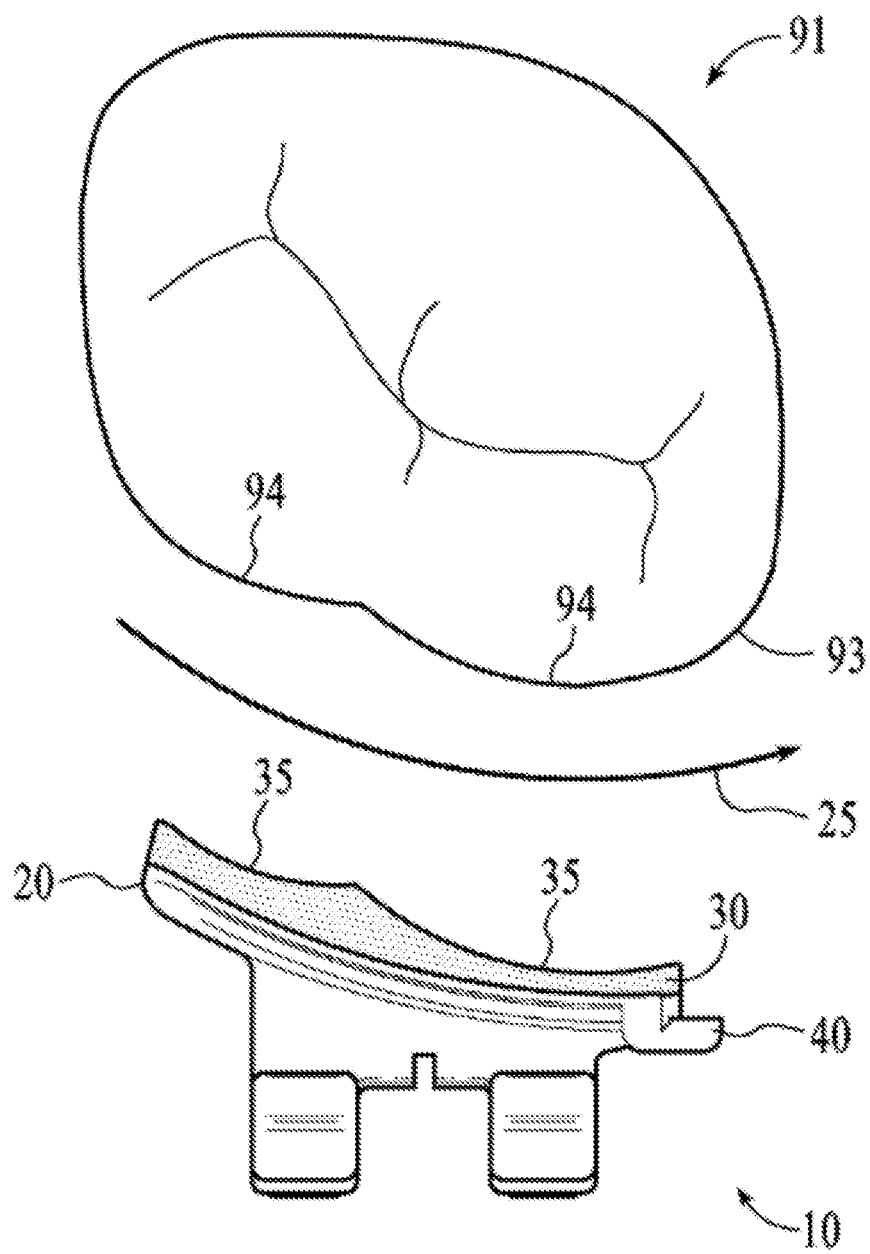
FIG. 5 is an occlusal view of an embodiment of a deciduous bracket for use on a deciduous lower first molar or upper deciduous first molar or upper deciduous second molar.

FIG. 5 shows an occlusal view of an embodiment of a deciduous bracket 10 configured to be complementary in shape to the surface morphologies of lower right deciduous first molars 91. In embodiments, a deciduous bracket 10 can also be complementary in shape to an upper deciduous first molar (not shown) or upper deciduous second molar (not shown). As shown in FIG. 5, base indentations 32 of deciduous bracket 10 can correspond to cusps 94 of the deciduous lower first molar 91 to facilitate tight bonding. Directional arrow 25 describes the overall radius of bracket base 30. This radius for this embodiment can range from about 3 to about 11 mm and corresponds to the overall curvature of the buccal crown surface 93 of deciduous first molar 91.

Figure 6:
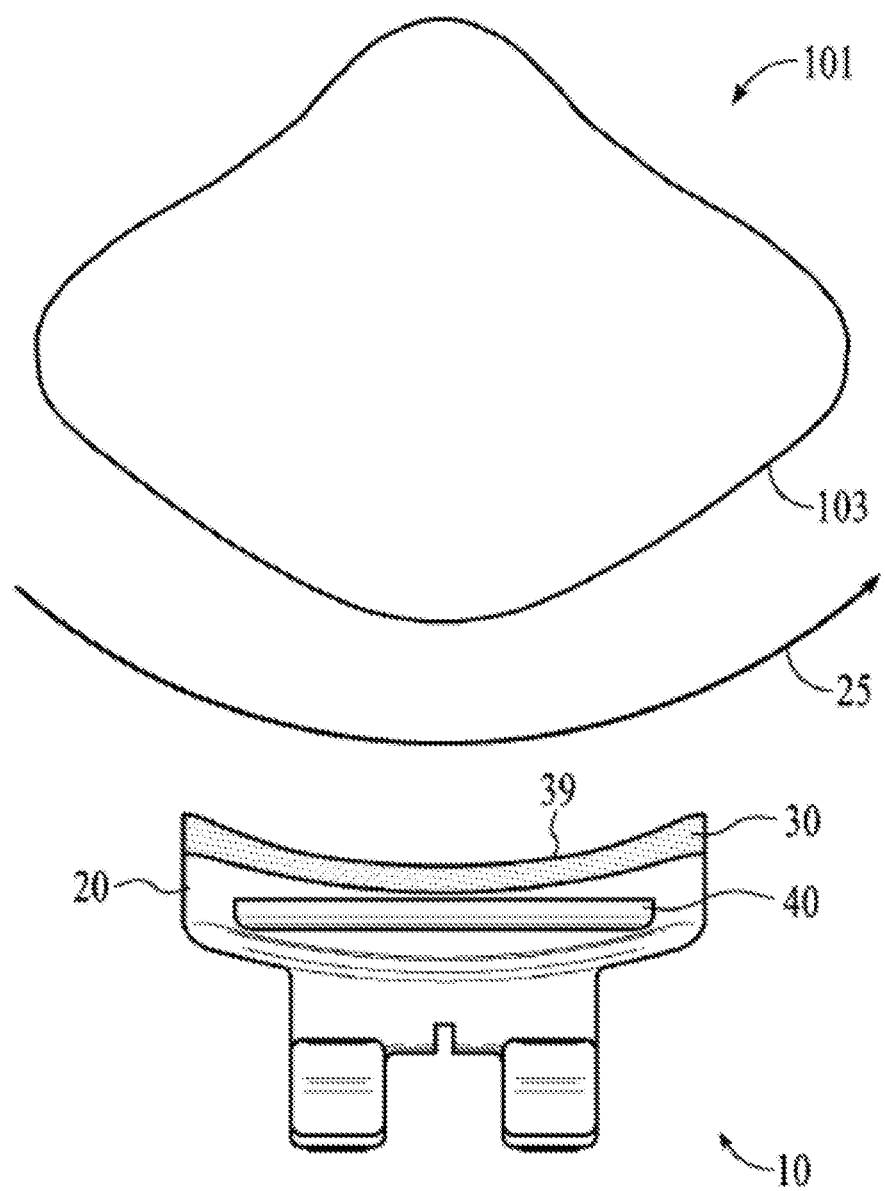
FIG. 6 is an occlusal view of an embodiment of a deciduous bracket designed for use on a deciduous canine tooth.

FIG. 6 is an occlusal view of an embodiment of deciduous bracket 10 for use on a deciduous canine tooth 101. In this embodiment the base surface 39 is smoothly curved to conform to the buccal surface 103 of deciduous canine tooth 101. Radius arrow 25 describes the overall radius of bracket base 30. The radius for this embodiment can range from about 2 to 6.0 mm. In embodiments, for example as shown in FIG. 6, debonding tabs 40 extend along an occlusal edge of the buccal body surface 20 of deciduous bracket 10 and extend away from the buccal body surface 20 occlusally.

Figure 7:
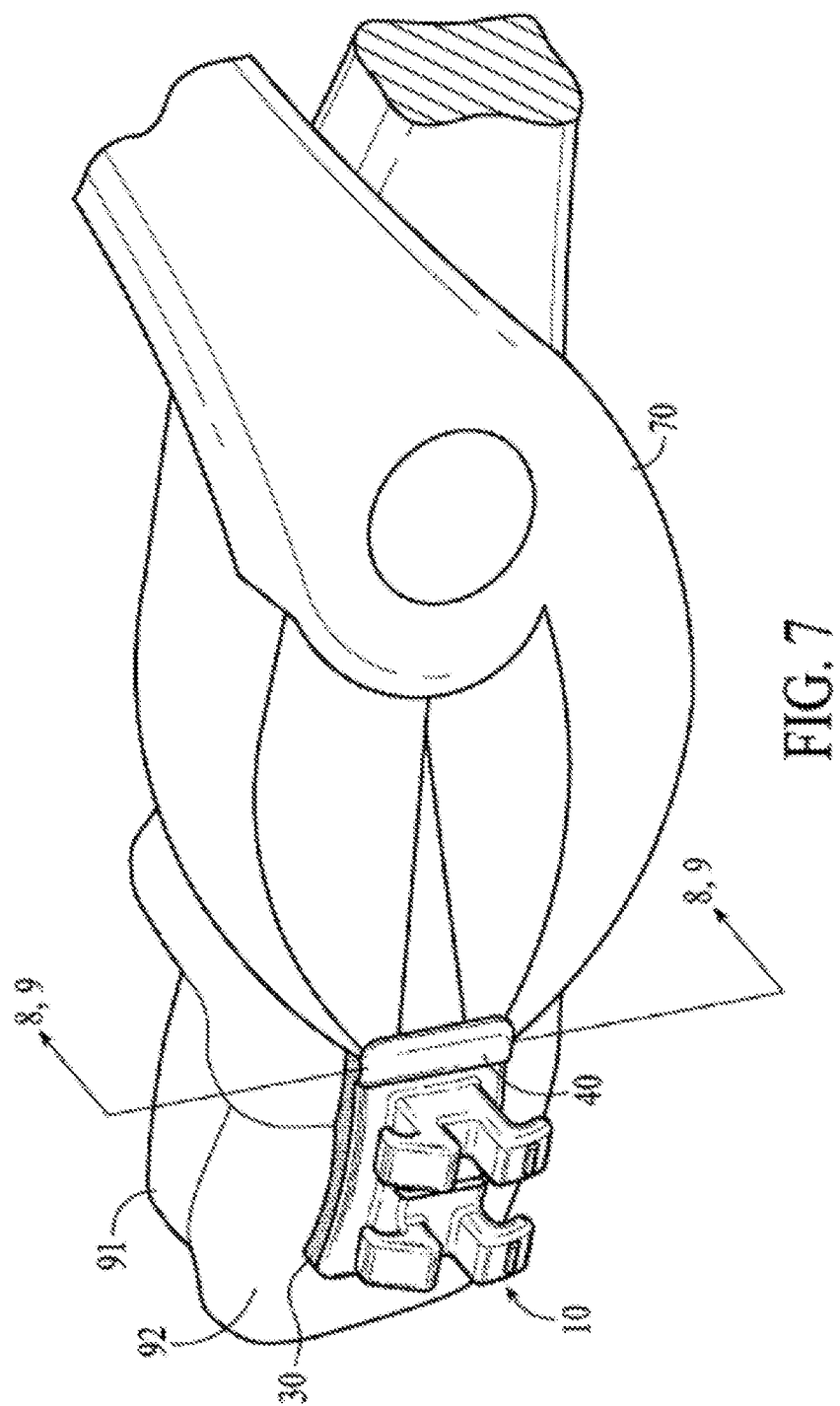
FIG. 7 depicts the process of debonding a deciduous bracket from a deciduous tooth prior to introduction of the debonding tool.
Figure 9:
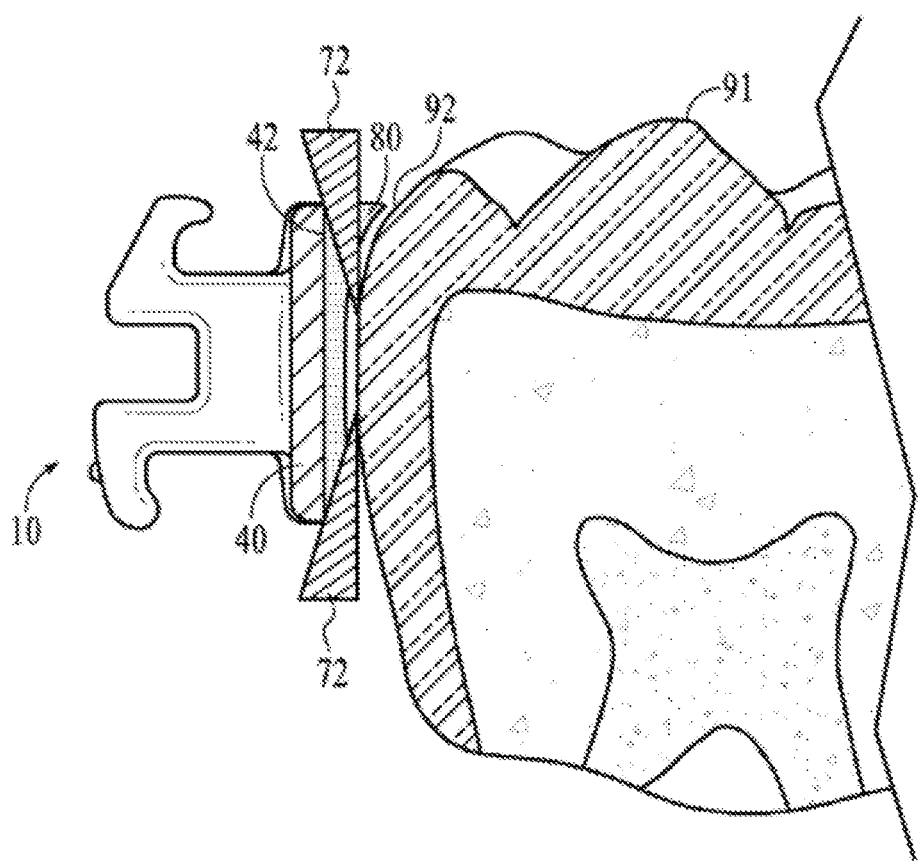
FIG. 9 depicts the process of debonding a deciduous bracket from a deciduous tooth where debonding has been completed.

FIGS. 7-9 depict an embodiment of a debonding process for debonding a deciduous bracket on deciduous tooth. As shown, with the deciduous bracket 10 attached to a deciduous tooth a debonding access area 80 is formed between the lingual surface 42 of the debonding tab 40 and the buccal crown surface 92 of the deciduous tooth. The deciduous bracket is sized so that the debonding access area is large enough to allow a debonding tool, for example a plier like tool, to be inserted into the access area for removal of the deciduous bracket from the deciduous tooth while exerting minimal pressure on the deciduous tooth, as will be discussed below. In embodiments, the distance between the lingual surface 42 of the debonding tab 40 and the buccal crown surface of the deciduous tooth is between 0.5 mm and 1.5 mm. In embodiments, the distance between the lingual surface 42 of the debonding tab 40 and the buccal crown surface of the deciduous tooth may be larger at the distal end of the debonding tab than at the proximal end of the debonding tab due to curvature of the deciduous tooth and/or the debonding tab being angled to partially extend in the buccal direction, as will be discussed below. Reducing the pressure on the deciduous tooth is beneficial during debonding because deciduous teeth become progressively looser as a child ages and the pressure during bracket removal can be quite uncomfortable for the child. FIG. 7 is a perspective view of deciduous bracket 10 attached to the buccal crown surface 92 of a deciduous first molar 91. An initial step in the debonding process is to insert the tips 72 of debonding tool 70, as shown in FIG. 8, into the access area defined by the lingual surface 42 of debonding tab 40 and the buccal crown surface of the tooth. FIG. 8 is a cross sectional view of deciduous bracket 10 as seen along reference line 8,9 of FIG. 7. As further shown in the view of FIG. 8 deciduous bracket 10 is attached to the buccal crown surface 92 of deciduous first molar 91 and tips 72 of debonding tool 70 have been introduced into debonding access area 80 but are not yet in contact with lingual surface 42 of debonding tab 40. FIG. 9 shows a further step of debonding as the same cross sectional view and features as FIG. 8, as seen along reference line 8,9 of FIG. 7. As shown in FIG. 9, the tips 72 of debonding tool 70 have been further inserted into debonding access area 80 and are in contact with both the lingual surface 42 of debonding tab 40 and the buccal crown surface 92 of deciduous first molar 91. The contact of the opposing sides creates simultaneous forces applied by the debonding tool against crown surface 92 and debonding tab 40 to effectuate debonding of deciduous bracket 10 from deciduous first molar 91. While an embodiment of a debonding process is shown and described using a debonding tab extending from a mesial side of the deciduous bracket, embodiments include substantially identical steps for debonding tabs extending from other sides of the deciduous bracket.

In embodiments, the debonding process shown in FIGS. 7-9 may be performed with debonding tabs extending in any direction around the perimeter of the deciduous bracket. Further, in embodiments, deciduous brackets may include a plurality of debonding tabs positioned along different sides of the perimeter of the deciduous bracket. For example, a deciduous bracket may include four debonding tabs, with one on the occlusal side extending along the mesial-distal direction, one on the distal side extending along the occlusal-gingival direction, one on the gingival side extending along mesio-distal direction, and one on the mesial side extending along the occlusal-gingival direction. In embodiments, deciduous brackets may include any number of debonding tabs, for example 1, 2, 3, or 4, which may be positioned symmetrically or asymmetrically radially around the perimeter of the deciduous bracket. In embodiments, a single debonding tab may extend around a plurality of sides of the deciduous bracket, including embodiments with a single debonding tab extending around the entire perimeter of the deciduous bracket. Advantages of multiple debonding tabs and a single debonding tab extending around the perimeter include the ability to use the same bracket on left or right teeth with a debonding tab or portion thereof extending mesially, the ability of being able to insert a debonding tool at one or more of a plurality of access areas, and the ability to orient the deciduous bracket at various rotational orientations, including inverted, while maintaining a debonding tab at the mesial and/or occlusal portion of the deciduous tooth.

FIGS. 11A-E show views of an embodiment of deciduous bracket 1110, for use on a deciduous canine tooth, including four debonding tabs 1140 extending in four directions around the base 1130. In embodiments, for example as shown in FIGS. 11A-E, the base 1130 of a deciduous bracket may be substantially circular. A circular base shape allows for the deciduous bracket to be positioned in a plurality of rotational orientations which can be used to angle the tie wing 1122 and archwire receiving therein, so that the deciduous canine tooth acts as an anchor for applying upward or downward forces to elicit bite opening or closing, therefore raising or lowering permanent incisors with permanent brackets that are adjacent to the deciduous canine tooth. As shown in the bottom/top view of FIG. 11B, depending on the orientation of the deciduous bracket, the base includes a concave surface profile 1125, configured to conform to the convex buccal surface of the deciduous canine tooth. Further, as shown in the side view of FIG. 11C, the base includes a concave surface profile 1126, also configured to conform to the convex buccal surface of the deciduous canine tooth.

Figure 11A:
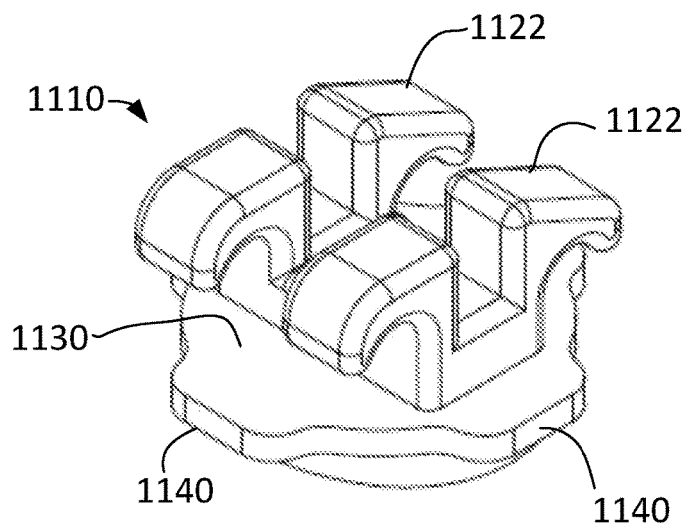
FIGS. 11A-E show of an embodiment of a deciduous bracket for use on a deciduous canine.
Figure 11B:
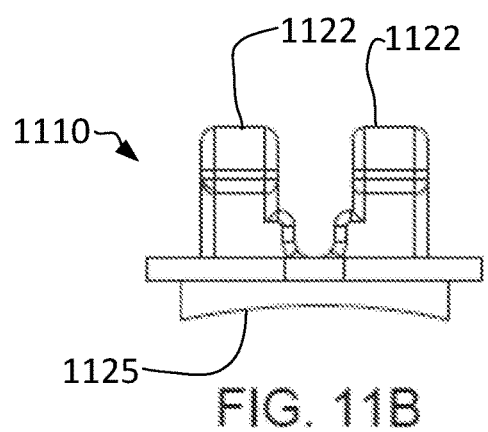
Figure 11C:
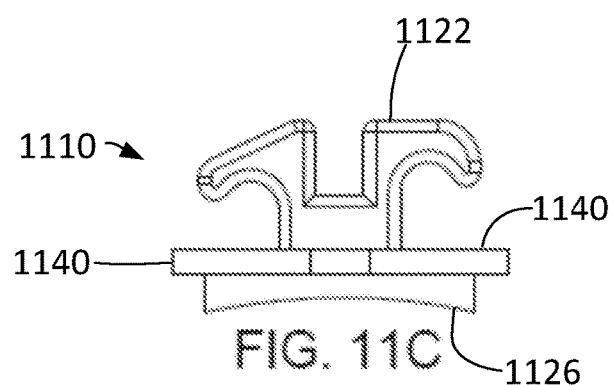
Figure 11D:
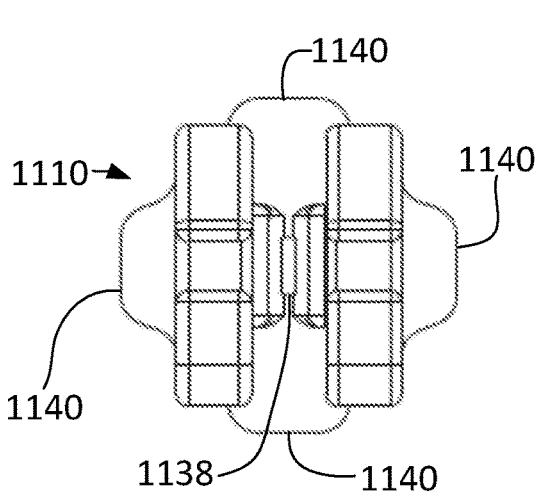
Figure 11E:
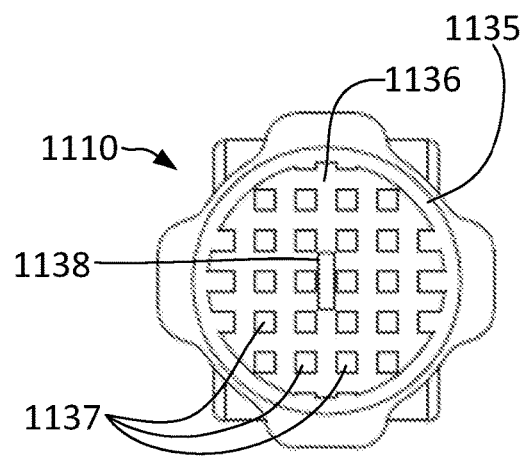
Figure 12A:
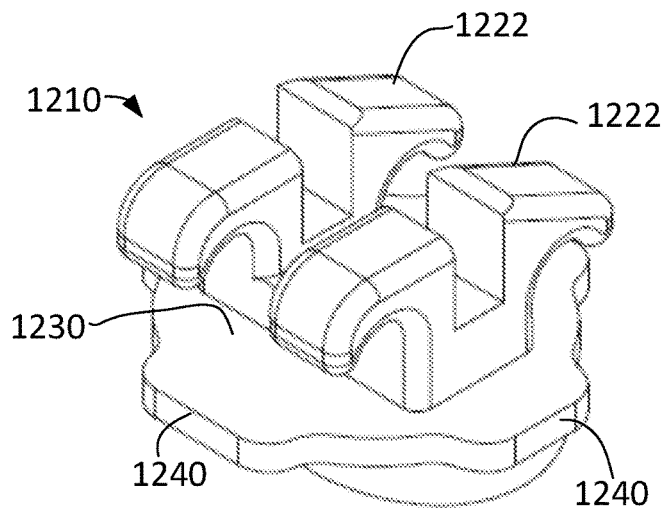
FIGS. 12A-E show of an embodiment of a deciduous bracket for use on a deciduous first molar.
Figure 12B:
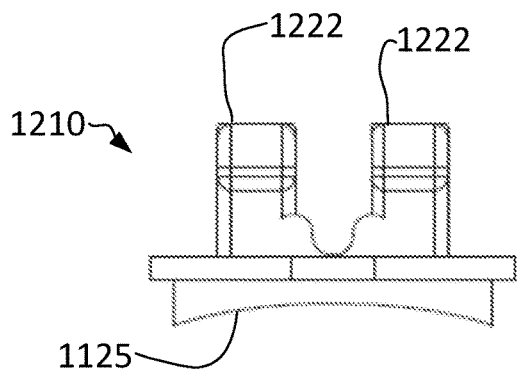
Figure 12C:
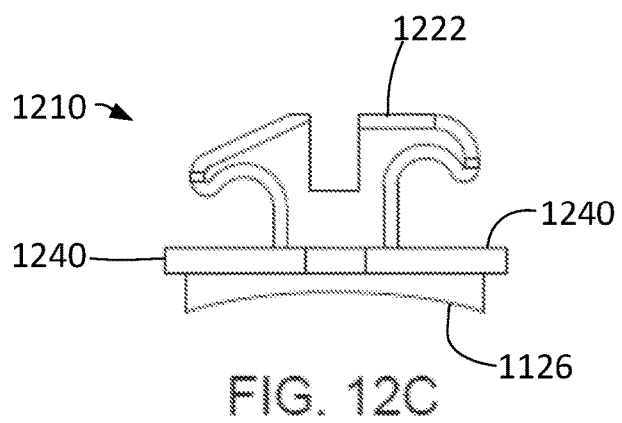
Figure 12D:
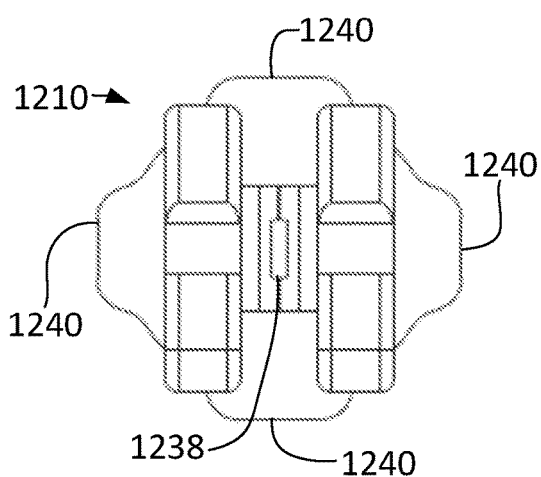
Figure 12E:
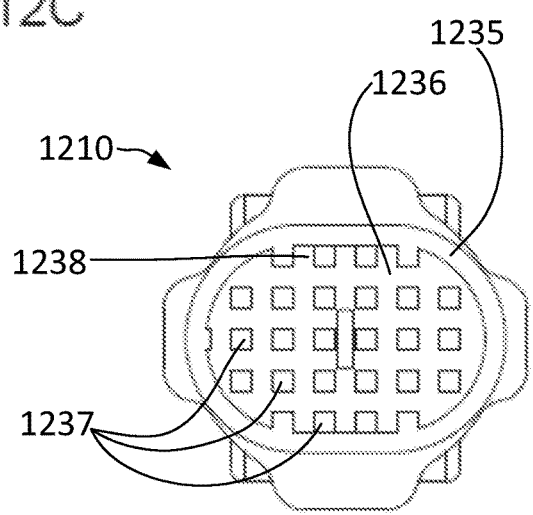
Figure 13A:
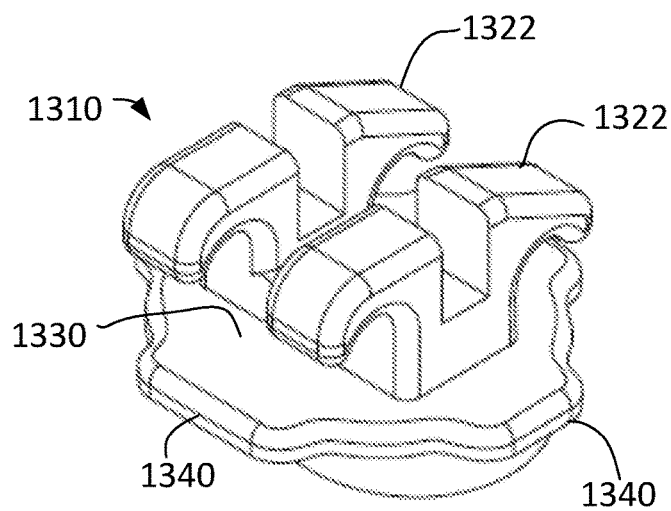
FIGS. 13A-E show of an embodiment of a deciduous bracket for use on a deciduous second molar.
Figure 13B:
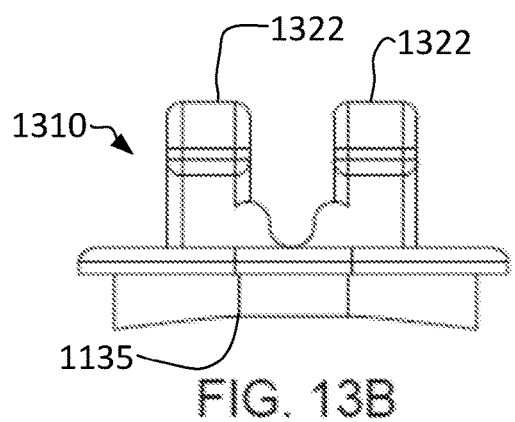
Figure 13C:
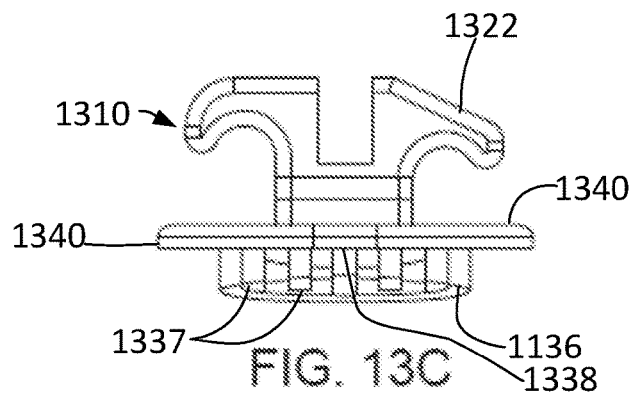
Figure 13D:
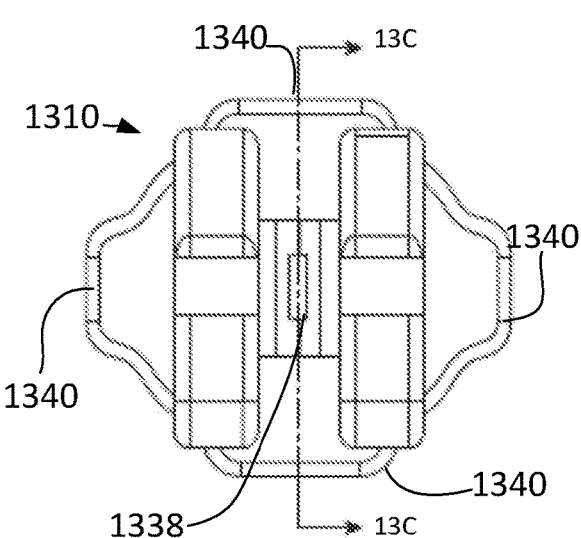
Figure 13E:
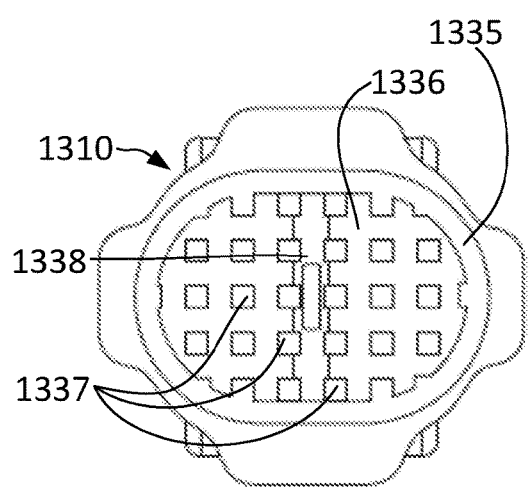

In embodiments, for example as shown in FIG. 11E, the base 1130 of the deciduous bracket includes an outer perimeter barrier wall 1135 defining an adhesive recess 1136. The perimeter barrier wall 1135 is configured to prevent uncured adhesive from seeping onto the crown surface of the tooth surrounding the deciduous bracket during the bonding process. Preventing adhesive on the surrounding surface is beneficial in maintaining access to the debonding access area during a debonding process. In embodiments, as shown in FIG. 11E, the outer perimeter barrier wall 1135 is circular. In embodiments, the outer perimeter barrier wall 1135 may have a height between 0.25 mm to 0.75 mm from the base of the adhesive recess 1136 to the lingual surface of the outer perimeter barrier wall 1135. Within the adhesive recess are a plurality of protrusions 1137 extending away from the base of the adhesive recess 1135. The lingual surfaces of the outer perimeter barrier wall 1135 and the protrusions 1137 form a base surface of the deciduous bracket 1130 with a morphological shape corresponding to the crown surface of the deciduous tooth that the deciduous bracket is configured to be attached to. In embodiments, as shown in FIGS. 11E and 11D, the adhesive recess includes a slot 1138 extending through the deciduous bracket from the base of the adhesive recess 1136 to the buccal side of the deciduous bracket 1110 between the tie wings 1122. The slot 1138 is configured to allow excess uncured adhesive to be expelled during the bonding process in order to allow the deciduous bracket to be secured close to the buccal crown surface and prevent excess uncured adhesive from expelling around the perimeter of the deciduous bracket onto the buccal crown surface around the deciduous bracket.

FIGS. 12A-E show an embodiment of deciduous bracket 1210 for use on a deciduous first molar. As shown, the embodiment of FIGS. 12A-E includes similar features as the embodiment of FIGS. 11A-E including base 1230, four debonding tabs 1240, concave surface profiles 1225 and 1226, perimeter barrier walls 1235, adhesive recess 1236, protrusions 1237, slot 1238, and tie wings 1222. FIGS. 13A-E show an embodiment of deciduous bracket 1310 for use on a deciduous bracket for a deciduous second molar. As shown, the embodiment of FIGS. 13A-E includes similar features as the embodiment of FIGS. 11A-E including base 1330, four debonding tabs 1340, concave surface profiles 1325 and 1326, perimeter barrier walls 1335, adhesive recess 1336, protrusions 1337, slot 1338, and tie wings 1322. The perimeter barrier wall and protrusions shown in FIG. 12E define a surface shaped to correspond to the surface morphology of a deciduous first molar. The perimeter barrier wall and protrusions shown in FIG. 13E define a surface shaped to correspond to the surface morphology of a deciduous second molar. As shown deciduous brackets of FIGS. 12A-E and FIGS. 13A-E have substantially oval shaped bases with substantially oval shaped perimeter barrier walls. In embodiments, the long axis of an oval shaped base of a deciduous bracket configured to be used with a deciduous second molar may be longer than the long axis of an oval shaped base of a deciduous bracket configured to be used with a deciduous first molar in order to better conform to the deciduous second molar having a wider buccal crown surface than the deciduous first molar.

FIGS. 14A-E show an embodiment of deciduous bracket 1410 including angled debonding tabs 1440. As shown, the embodiment of FIGS. 14A-E includes similar features as the embodiment of FIGS. 11A-E including base 1430, perimeter barrier walls 1435, adhesive recess 1436, protrusions 1437, slot 1438, and tie wings 14322. As shown in the cross-section of FIG. 14B, angled deboning tabs 1440 extend away from the base 1430 in the radial direction, as well as partially in the buccal direction. When attached to a tooth, as described in relation to FIGS. 7-9, the angled debonding tab 1440 creates a flared open access area. The flared open access area may allow for easier access with a debonding tool. In embodiments, the angled debonding tab may be angled from 0-45 degree relative to a buccal plane defined by a plane tangent to the buccal crown surface at the center of the deciduous bracket.

Figure 10:
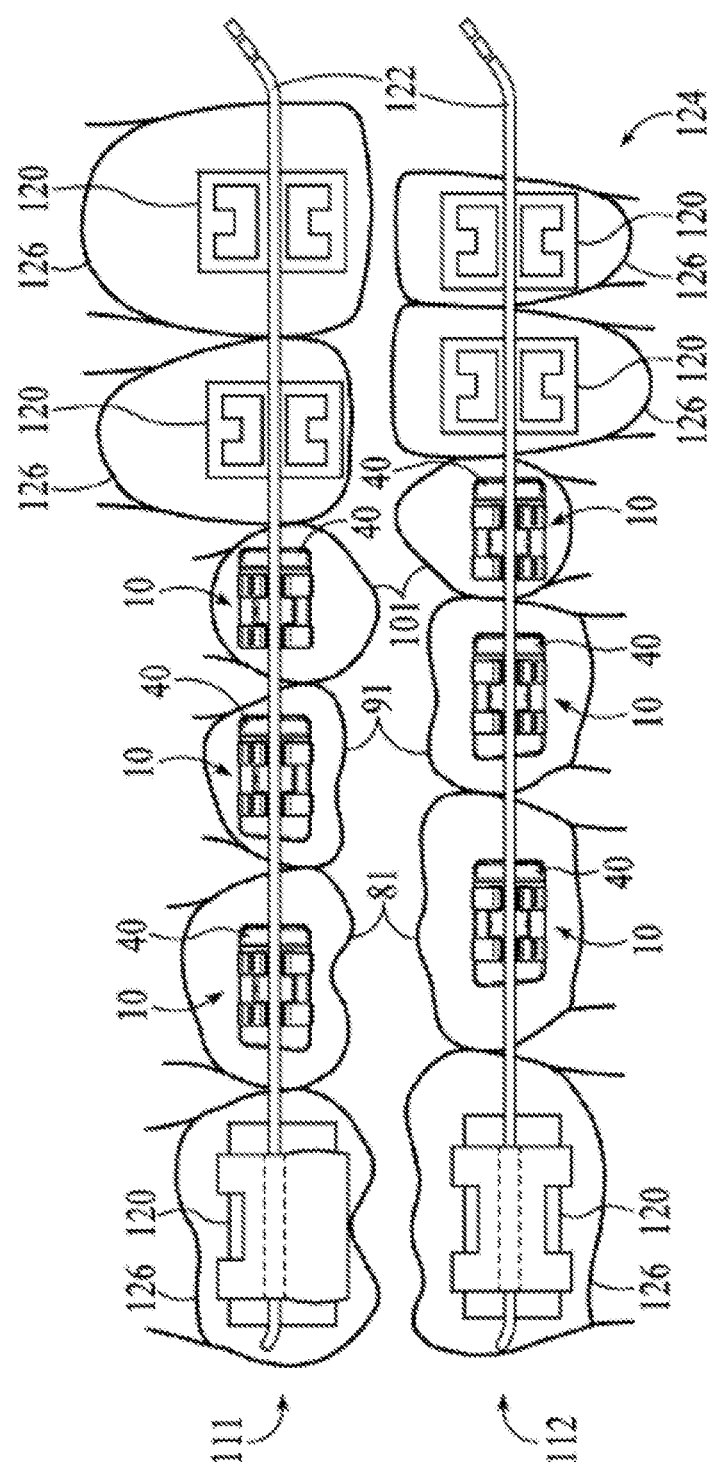
FIG. 10 is a side view of a dental appliance on mixed dentition and having both deciduous brackets and permanent orthodontic brackets.

FIG. 10 depicts an embodiment of a method of using deciduous brackets, as disclosed above, for the correction of misaligned teeth and bite problems on upper and lower mixed dentition dental arches. Dental appliance 124 is shown on upper and lower dental arches, 111 and 112 respectively. Dental appliance 124 is comprised of deciduous brackets 10 on second deciduous molars 81, first deciduous molars 91 and deciduous canines 101, wherein the deciduous brackets 10 for each tooth may be differently shaped and may be configured for the type of deciduous tooth that they are bonded to, as disclosed above. Dental appliance 124 is further comprised of permanent brackets 120 attached to permanent teeth 126, and archwires 122. As shown, permanent brackets 120 are significantly larger in the occluso-gingival dimension than deciduous brackets, and may maybe have diameters ranging from 3.5-5 mm whereas deciduous brackets have diameters ranging from 2.5-2.5 mm.

Figure 15:
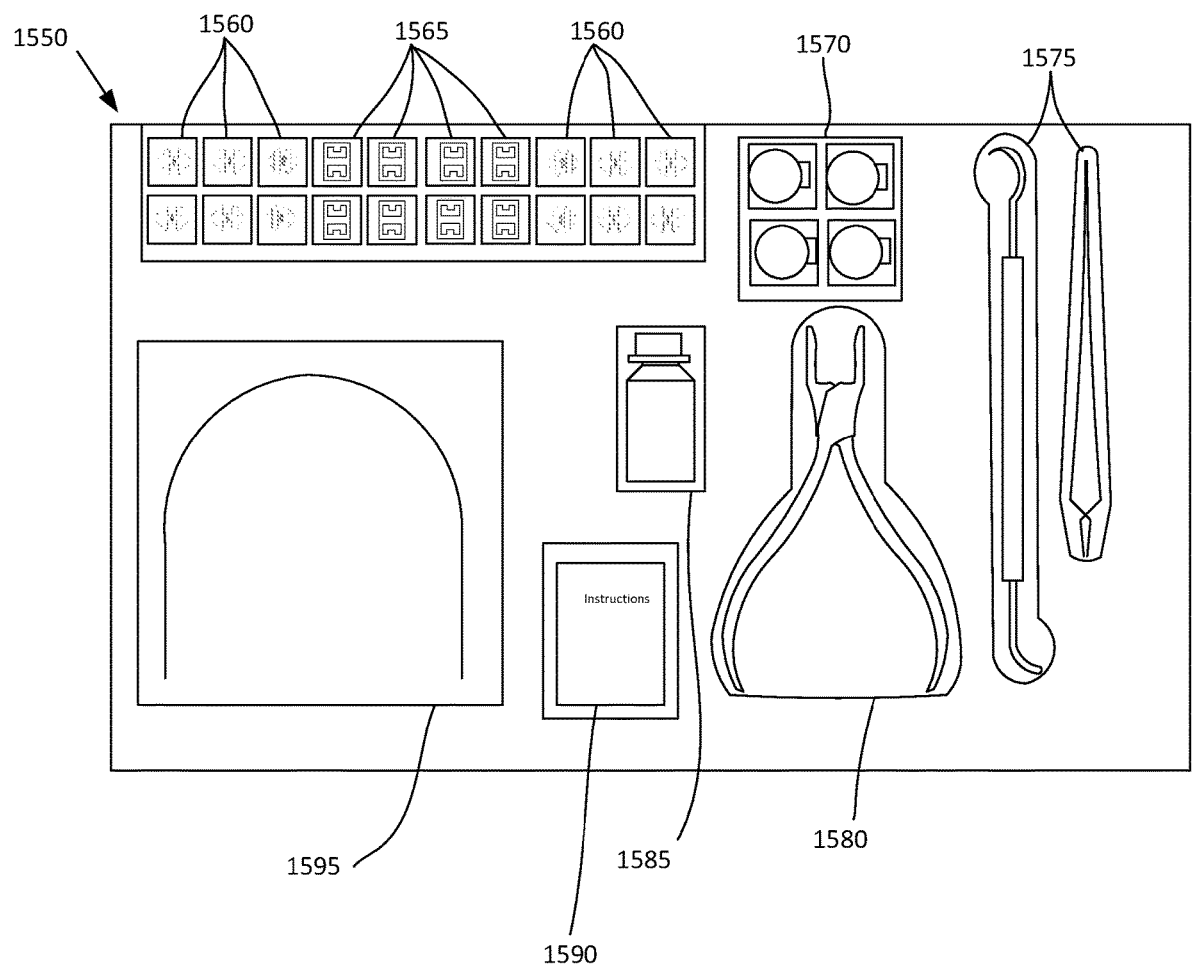
FIG. 15 shows a kit including deciduous brackets.

Embodiments of the deciduous brackets as disclosed herein may be included in a kit, used for early correction of a malocclusion during deciduous or mixed-dentition periods treating. FIG. 15 shows an embodiment of a kit 1550. In embodiments, a kit 1550 may include an enclosure defining compartments 1560 for a plurality of deciduous brackets. The deciduous brackets may include a top and/or bottom, and left and/or right for each of the deciduous first molars, deciduous second molars, and deciduous canines. For example, a kit many include deciduous brackets comprising four brackets configured for deciduous first molars, two brackets configured for upper deciduous second molars, two brackets configured for lower deciduous second molars, and four brackets configured for deciduous canines. The kit may further include four compartments 1565 for permanent brackets for permanent incisors. In embodiments, the kit may be provided to a dental provider without the permanent brackets included in order for the dental provider to insert permanent brackets of their preference. In embodiments, permanent brackets for the permanent incisors are included in the kit. The kit may further include compartments 1570 for molar tubes. The kit may further include tweezers and guiding instruments 1575, such as scalers and hollenbeck to hold and place the brackets during bonding to the teeth, and debonding instruments 1580 and scalers for removal of brackets and cleaning of teeth surfaces. The kit may further include bonding adhesive 1585. The kit may further include archwires 1595. The kit may further include instructions 1590 for use of the brackets. Examples of treatment protocols and procedures can be found in "Interceptive Orthodontic Treatment: Efficient Early Correction of Malocclusions" by Mashouf, C. and Mashouf, K., July 2017, available at (http://interceptiveortho.com/wp-content/uploads/2013/12/Interceptive-Orthodontics-ManuscriptRevised.pdf).

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

What is claimed is:

1. An orthodontic bracket comprising:
    a first body portion comprising a bonding surface configured to be bonded to a buccal crown surface of a deciduous tooth in a first orientation;
    a second body portion coupled to the first body portion and comprising a first buccal surface configured to face away from the buccal crown surface of the deciduous tooth and one or more tie wings configured for attachment of an archwire;
    a first debonding tab coupled to and extending away from the second body portion, wherein in the first orientation the first debonding tab extends along an occlusal side of a perimeter of the second body portion, and wherein the first debonding tab comprises a first lingual surface recessed relative to the bonding surface and configured to face the buccal crown surface in the first orientation and define a first debonding access area between the buccal crown surface and the first debonding tab;
    a second debonding tab coupled to and extending away from the second body portion, wherein in the first orientation the second debonding tab extends along a mesial side of the perimeter of the second body portion, and wherein the second debonding tab comprises a second lingual surface recessed relative to the bonding surface and configured to face the buccal crown surface in the first orientation and define a second debonding access between the buccal crown surface and the second debonding tab;
    a third debonding tab coupled to and extending away from the second body portion, wherein in the first orientation the third debonding tab extends along a gingival side of the perimeter of the second body portion, and wherein the third debonding tab comprises a third lingual surface recessed relative to the bonding surface and configured to face the buccal crown surface in the first orientation and define third debonding access between the buccal crown surface and the third debonding tab; and
    a fourth debonding tab coupled to and extending away from the second body portion, wherein in the first orientation the fourth debonding tab extends along a distal side of the perimeter of the second body portion, and wherein the fourth debonding tab comprises a fourth lingual surface recessed relative to the bonding surface and configured to face the buccal crown surface in the first orientation and define a fourth debonding access area between the buccal crown surface and the fourth debonding tab,
    wherein the first, second, third, or fourth debonding access area is configured to receive a portion of a debonding tool in order to debond the orthodontic bracket from the deciduous tooth,
    wherein the first body portion comprises a perimeter barrier wall defining an adhesive recess and a plurality of protrusions within the adhesive recess,
    wherein the perimeter barrier wall and protrusions define a surface complementary in shape to surface morphologies of the buccal crown surface of the deciduous tooth,
    wherein the adhesive recess is configured to receive adhesive to bond the orthodontic bracket to the buccal crown surface of the deciduous tooth,
    wherein the perimeter barrier wall does not define passages between the adhesive recess and the first, second, third and fourth debonding access areas,
    wherein the orthodontic bracket further comprises a rectangular slot extending from the adhesive recess through the first body portion and through a portion of the first buccal surface of the second body portion,
    wherein the perimeter barrier wall and the rectangular slot are configured to prevent excess adhesive from flowing onto the buccal crown surface of the deciduous tooth outside of the perimeter barrier wall and to allow excess adhesive to flow through the rectangular slot from the adhesive recess through the first body portion and the second body portion during bonding of the orthodontic bracket to the deciduous tooth,
    wherein the one or more tie wings comprises two tie wings extending from the first buccal surface, and
    wherein the rectangular slot comprises an opening on the first buccal surface located between the two tie wings.

2. The orthodontic bracket of claim 1, wherein the second body portion is circular in shape and the first body portion is configured to be complementary in shape to surface morphologies of the buccal crown surface of the deciduous tooth, wherein the deciduous tooth is a deciduous canine.

3. The orthodontic bracket of claim 1, wherein the second body portion is oval in shape and the first body portion is configured to be complementary in shape to surface morphologies of the buccal crown surface of the deciduous tooth, wherein the deciduous tooth is a deciduous first molar or a deciduous second molar.

4. The orthodontic bracket of claim 1, wherein the first debonding tab further extends away from the first buccal surface of the second body portion in a buccal direction so that the first debonding access area recess flares open away from the second body portion.

5. The orthodontic bracket of claim 1, wherein in the first orientation the first, second, third and fourth debonding tabs are configured to extend parallel to the first buccal surface of the second body portion.

* * * * *